United States Patent Office 3,463,689
Patented Aug. 26, 1969

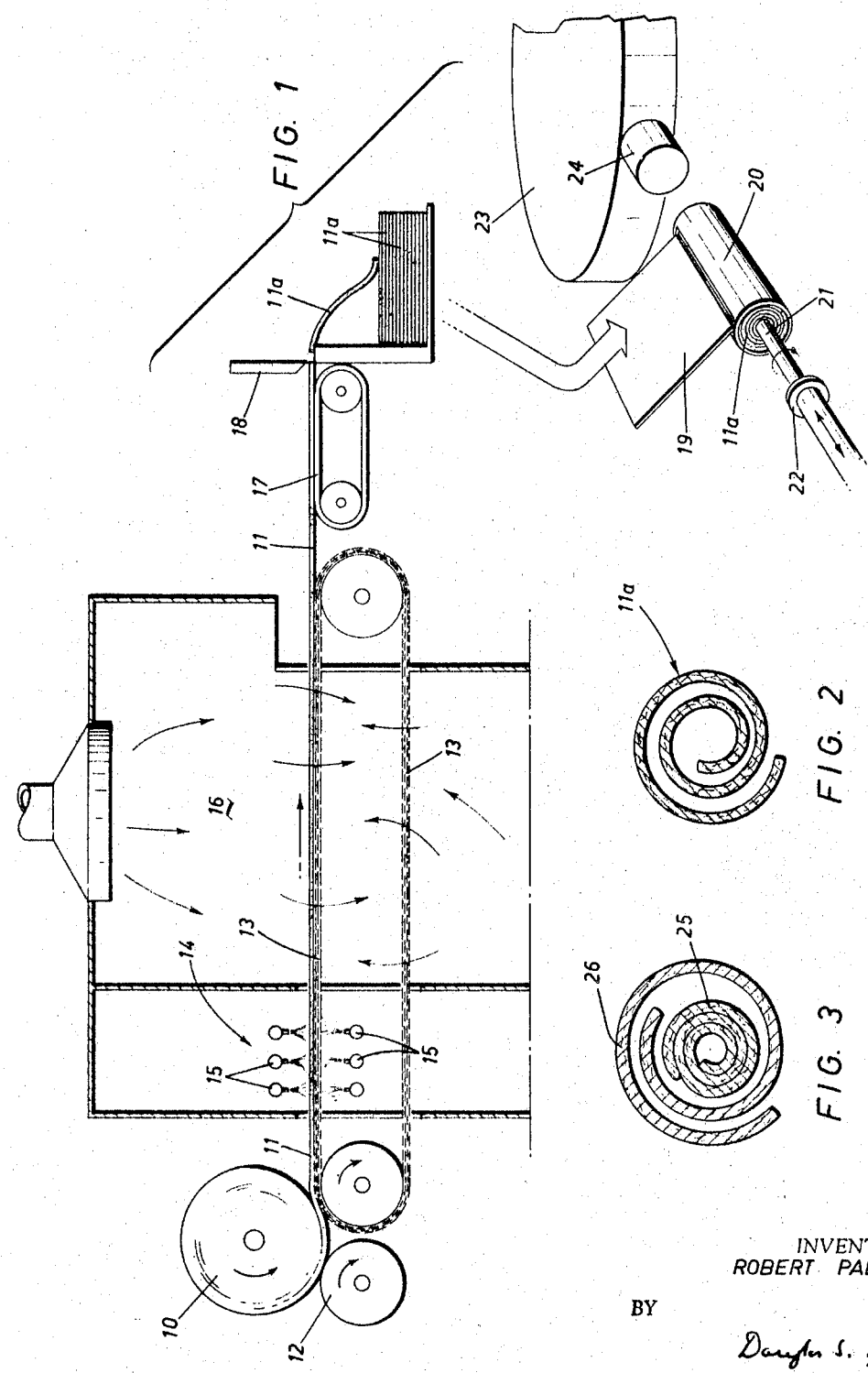
Aug. 26, 1969     R. PALMAI     3,463,689
METHOD OF FORMING FILTERS FROM FIBROUS MATERIAL
Original Filed April 6, 1964
INVENTOR.
ROBERT PALMAI
BY
*Attorney*

3,463,689
METHOD OF FORMING FILTERS FROM FIBROUS MATERIAL
Robert Palmai, Preston, Ontario, Canada, assignor to Sheller-Globe Corporation, a corporation of Ohio
Continuation of application Ser. No. 357,491, Apr. 6, 1964. This application June 7, 1968, Ser. No. 735,242
Int. Cl. B65h 81/00; B31c 13/00; B01d 39/16
U.S. Cl. 156—190                                    3 Claims

ABSTRACT OF THE DISCLOSURE

A method of producing hollow cylindrical filters from a mat of non-woven fibrous material of selected density comprising the steps of impregnating the fibrous material with a thermosetting resin, drying said impregnated fibrous material at a temperature below the curing point of the resin, feeding the mat edgewise through a slot in the wall of a cylinder onto a rotating member located therein to form said mat into the requisite filter form without changing the density and then curing the resin in the formed filter.

---

This application is a continuation of my application Ser. No. 357,491, filed Apr. 6, 1964, now abandoned.

This invention relates to filters and more particularly to filters produced from fibrous material; one well known use of such filters is in the circulating lubricating systems of internal combustion engines for removing dirt or sludge from the lubricant.

The conventional method of manufacture of filters composed of fibrous material is to feed the material into a can or cylinder which then provides the requisite circumferential support, the whole being known as a filter cartridge; the supporting cannister constitutes a significant proportion of the weight of the cartridge and if it could be eliminated the cost of transportation would be reduced, but to the applicant's knowledge filter cartridges comprised of fibrous material unsupported by a cannister have not hitherto been produced.

The efficiency of filter cartridges already described depends on the uniformity of the filter media; to overcome this problem a method is described in applicant's U.S. application 101,737, now Patent No. 3,135,075, for producing filter cartridges by uniformly compressing the filter media into a compact mat with its subsequent placement in the supporting can or cylinder. While this method overcomes the problem of ensuring uniformity of a particular density of the filter media along the length of the cartridge it is difficult to alter the degree of compaction and provide filters which differ in density one from the other, but are uniform within themselves. Also it is even more difficult in this method to arrange for a controlled variation of density through the cross section of the filter although there are many applications for use of filters constructed in this way.

It is an object of this invention to provide a method of producing a filter element composed of fibrous material which has sufficient form and rigidity to eliminate the need for a supporting cannister.

It is, furthermore, an object of this invention to provide a method of producing filter elements free from external circumferential support composed of fibrous material having uniform density through its cross section.

Still another object of this invention is to provide a method of producing a filter element composed of fibrous material of compact form and suitable for transportation which has a density varying in controlled manner through the cross section of the filter.

Yet another object of this invention is to provide a method of producing filter elements free from circumferential external support composed of fibrous material having a selected density.

How this and other objects of this invention are achieved will become apparent in the light of the accompanying disclosure and with reference to the accompanying drawing, wherein:

FIGURE 1 is a schematic diagram illustrating the method of producing filters of fibrous material in accordance with this invention;

FIGURE 2 is a diagram illustrating the form of a filter of fibrous material having a selected density produced according to this invention;

FIGURE 3 is a diagram illustrating the form of the filter of fibrous material having a controlled variation of density produced in accordance with this invention.

In accordance with one embodiment of this invention the method of producing filters of fibrous material unsupported by external means is based on the use of a mat of fibrous material, impregnating the mat with a thermosetting resin, drying the mat at a temperature below that at which curing of the resin commences, forming the dried mat into the requisite filter form and, finally heating the formed filter to a temperature at which curing of the resin takes place.

In a further embodiment of the invention the starting material is a non-woven fibrous mat having a specified density which is then impregnated with a thermosetting resin, dried below the temperature of curing of the resin, formed into the filter and finally heated to a temperature at which the resin is cured to provide a filter of uniform and selected density.

In accordance with another embodiment of this invention mats of fibrous material, each having a different density, and dried after impregnation with thermosetting resin, are placed in contact to form a filter which on subsequent curing will exhibit a selected and controlled variation in density through its cross section.

Referring now to FIGURE 1 of the drawings, there is illustrated therein steps producing the filter of fibrous material in accordance with one embodiment of this invention. A roll 10 composed of a non-woven mat 11 of loose fibre is used as the starting material; in a preferred embodiment of the invention a mat 11 is composed of rayon fibre, though it is understood that the invention is not limited thereto. It is not part of the invention to produce the non-woven mat 11, but as starting material it is specified to have a certain weight per square yard to provide a particular density, the one selected for a particular filter being, of course, determined by the degree of purification of liquids required during filtration. For instance, in the case of a filter intended for use in the circulating lubricating systems of internal combustion engines it has been found that a non-woven rayon mat weighing 5.8 ozs. per square yard is particularly suitable as a starting material. However, it will be appreciated that in cases where filters are employed to remove finer particles than those usually encountered in the circulating lubricating systems of internal combustion engines a mat of somewhat finer fibre having a greater weight per square yard would be employed to provide a higher density.

Positioned below the suitably supported roll 10 is a driven roller 12 having its surface in contact with the mat 11 of the roll 10; the rotation of the roller 12 causes the mat 11 to unwind evenly from the roll 10 onto an adjacent moving screen 13 which carries it to a station 14 where it passes between a series of nozzles 15. The nozzles 15, which may have an oscillating movement, are connected to a pressure source, not shown, which supplies liquid thermosetting resin and are actuated to impregnate the non-woven mat 11 with a fine spray of resin for a period of time sufficient to ensure entry of the resin into the interstices in the mat. While there are, of course, many types of thermosetting resins on the market, one which has been found particularly useful in practice is melamine formaldehyde.

After the mat 11 has been impregnated with a fine spray of resin it is then carried on the moving screen 13 to a position where the mat 11 is dried completely. However, while the drying step should be conducted thoroughly, it is essential that the temperature of the non-woven mat 11 during the drying step must not rise to a point where curing of the thermosetting resin would commence. Many forms of apparatus may be employed to accomplish the drying step, but particularly suitable is a conventional type of circulating air furnace 16 through which the mat 11 will pass carried on the moving screen 13; the furnace 16 has a sufficiently accurate control to ensure that the temperature of the air does not attain the level at which curing of the thermosetting resin would commence. By way of example and not by way of limitation, a non-woven web of loose rayon fibre weighing 5.8 ozs. per square yard impregnated with a spray of melamine formaldehyde would be completely dry in a matter of 3 mins. on passage through a circulating air furnace in which the temperature of the air is in the range of 150° F. and 190° F.; the latter temperature must not be exceeded otherwise the melamine formaldehyde will start to undergo the process of curing and as a result the forming step of the invention, described below, would not be possible.

After drying the non-woven mat 11 leaves the drying oven 16 and is then transferred to a table 17 where it is cut into suitable lengths 11a by cutting means 18. Each length of dried mat 11a is then advanced to the step where it is formed into the requisite filter shape. While a variety of means may be employed for such forming, a particularly suitable arrangement is to pass the dried mat 11a edgewise on an inclined plate 19, the lower end of which communicates with a suitable slot provided in a cylinder 20 inside which an arbour 21 rotates. The strip 11a is carried around by the rotating arbour 21 which is arranged to stop when the strip 11a is completely enclosed in the cylinder 20 at which point the formed web is ejected by means of a pusher member 22.

After ejection from the cylinder 20 the web now formed as shown in FIGURE 2 is then subjected to the final step of heating at a temperature sufficient to cure the resin which impregnates the filter. While anyone of a number of means may be employed for this purpose, it is convenient to have a circular platform 23 located adjacent to the forming cylinder 20, the circular platform 23 having at its circumference a series of molds 24, only one of which is shown in FIGURE 1, with each, in turn, being arranged in line with the cylinder 20 to receive the ejected formed filter. The mold 24 is provided with suitable heating elements, not shown, which provide a means of heating the formed filter to a temperature sufficient to cure the resin completely. However, the temperature in the mold 24 should not exceed the point where scorching of the fibre would occur. By way of example, if the resin used for impregnation is melamine formaldehyde the temperature of the mold 24 is raised to a point between 350° F. and 380° F. for a period of 3½–4 mins.

In another embodiment of the invention, a filter is formed as shown in FIGURE 3 comprised of layers 25 and 26 of mats of different densities conveniently produced by using different fibre thicknesses which are treated separately according to the steps of the invention outlined above to the point where they are cut to the lengths 11a. After this stage a suitable length of the mat 25 of one selected density is fed into the cylinder 20 in the manner already described, after which a suitable length of the mat 26 of a different density is fed into the cylinder 20, thus forming a cylindrical filter in which the cross section is comprised in part of a web having one density and in another part of a web of a different density. By way of example one layer 25 was comprised of a mat weighing 5.8 ozs. per square yard and the other layer 26 a mat weighing 6.3 ozs. per square yard. In use the outer layer 25 screens out the larger particles and the adjacent inner layer 26 screens out the finer particles; such filters have the advantage that there is less interference with the flow of liquid in the system.

While certain embodiments have been illustrated and described for the purpose of disclosure, it will be understood that the invention is not limited thereto, but contemplates such modifications and other embodiments as may be utilized without departing from the invention.

I claim:

1. A method of producing hollow cylindrical filters from a mat of non-woven fibrous material of selected density comprising the steps of:

impregnating the fibrous material with thermosetting resin, drying said impregnated fibrous material at a temperature below the curing point of said resin, feeding said mat edgewise through a slot in the wall of cylinder onto a rotating member located therein to carry the mat around the rotating member and completely enclose the mat and thereby form said mat into the requisite filter form without changing the density, interrupting the rotation of the rotating member, applying an axial force to the filter form to transfer the form from the member to a mold, and curing the resin by applying heat thereto while the form is in the mold.

2. The method set forth in claim 1 including the step of impregnating the fibrous material by applying the resin thereon.

3. The method set forth in claim 1 which comprises impregnating a second mat of fibrous material having a different density than the fibrous material of the first mat with a thermosetting resin, drying said second mat at a temperature below the curing point of the resin, and feeding said second mat edgewise through the slot in the wall of the cylinder onto the first mat while it is on the rotating member and before it is transferred to said mold to carry the second mat around the first mat and completely enclose said second mat and thereby form a filter form comprising in part a web having one density and in another part a web of a different density.

References Cited

UNITED STATES PATENTS

| | | | |
|---|---|---|---|
| 2,607,494 | 8/1952 | Valente et al. | 210—508 X |
| 3,061,107 | 10/1962 | Taylor | 210—487 |
| 3,170,826 | 2/1965 | Norton et al. | 156—204 X |
| 3,304,356 | 2/1967 | Palmai | 264—137 |
| 3,347,725 | 10/1967 | Stephens et al. | 156—184 |
| 3,390,429 | 7/1968 | Palmai | 156—215 X |

EARL M. BERGERT, Primary Examiner

R. A. KILLWORTH, Assistant Examiner

U.S. Cl. X.R.

156—215; 210—508